Patented Aug. 20, 1940

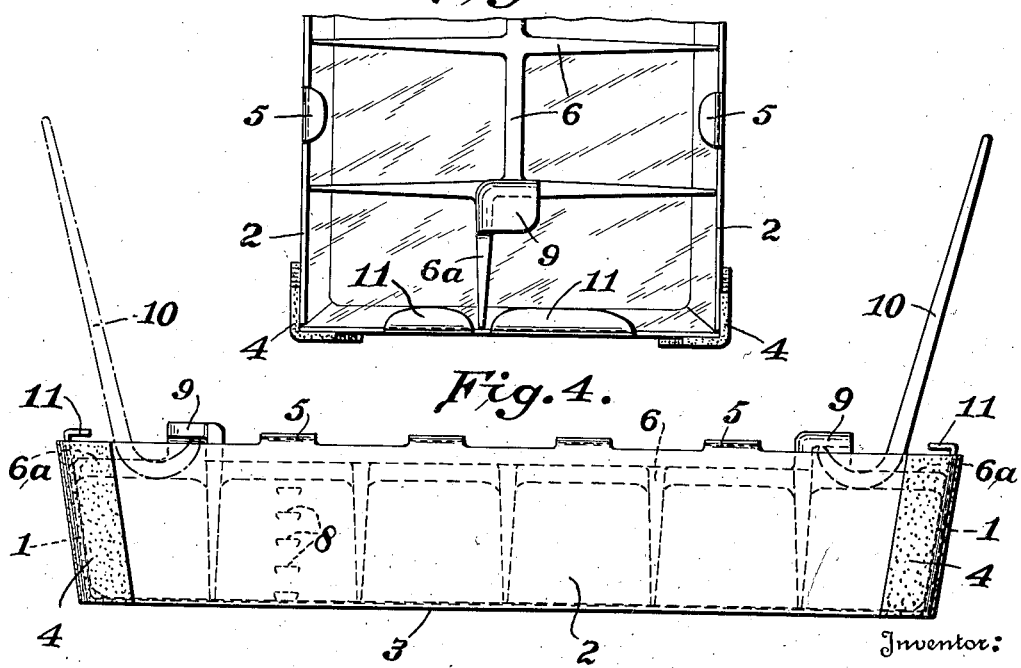

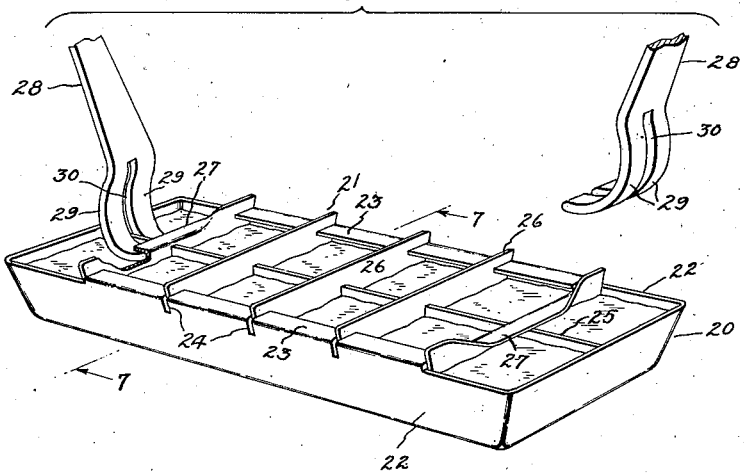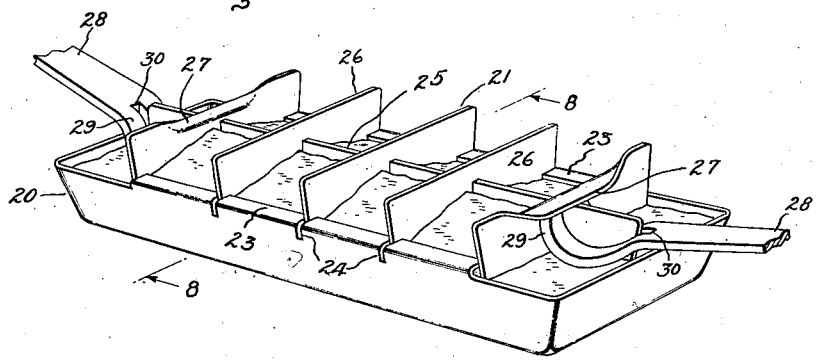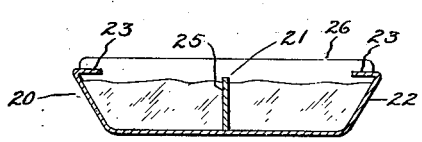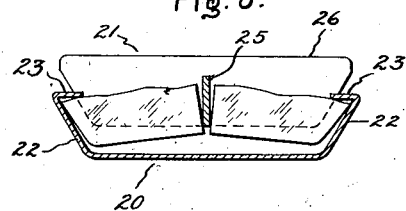

2,212,425

UNITED STATES PATENT OFFICE 2,212,425

FREEZING TRAY

James H. Miner, Meridian, Miss., assignor to General Electric Company, a corporation of New York Application June 29, 1937, Serial No. 151,000

8 Claims. (Cl. 62—108.5)

My invention relates to freezing trays employed in refrigerating machines for producing ice blocks or the like.

This application is a continuation-in-part of my application, Serial No. 110,374, filed November 11, 1936.

It is an object of my invention to provide a freezing tray and a grid for producing ice blocks and an improved arrangement for mechanically releasing the ice blocks from the freezing tray and the grid without thawing the frozen bonds between the ice blocks and the freezing tray and the grid.

Another object of my invention is to provide a freezing tray composed of metal or mainly of metal, the walls of which are yieldingly connected at the corners of the tray so that in lifting the grid from the tray, together with the ice blocks or cubes carried by said grid, the side walls of the tray may flex outwardly in order to provide or accommodate the tilting of the ice blocks, the upper outer edges of which may fulcrum under projections carried by the side walls.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawings, in which:

Fig. 1 is an end view of a freezing tray and a grid embodying my invention.

Fig. 2 is an end view showing the grid lifted part way from the tray showing the flexed condition of the side walls of the tray, the ice blocks in their tilted position being indicated in dotted lines.

Fig. 3 is a fragmentary plan view of one end of the tray with a portion of the grid shown therein.

Fig. 4 is a side view of the tray, the grid, and an arrangement including a pair of levers for lifting the grid with respect to the tray.

Fig. 5 is a perspective view of a modified form of freezing tray and grid for producing ice blocks and an arrangement including a pair of levers for lifting the grid with respect to the tray.

Fig. 6 is a perspective view of the tray and the grid shown in Fig. 5, the grid being illustrated in a position lifted part way from tray by the pair of levers.

Fig. 7 is a transverse sectional view of the tray and the grid along the line 7—7 of Fig. 5.

Fig. 8 is a transverse sectional view of the tray and the grid along the line 8—8 of Fig. 6.

Referring to the drawings, in Fig. 1 I have shown a shallow rectangular freezing tray having upstanding end walls 1 and side walls 2. The tray is provided with a bottom wall 3 which is integral with the end and side walls adjacent the lower portions thereof, and may be formed from a single sheet of metal cut out at the corners and folded up. The end and side walls of the tray are connected by means, or in such a way that the side walls 2 may flex or move outwardly from each other, each performing a slight turning action about the lower edge thereof, where it attaches to the bottom wall of the tray. In order to provide for this outward flexing or tilting movement of the side walls of the tray, there is provided a connection at each corner of the tray consisting of a resilient member 4 which may be composed of a rubber sheet or piece cemented to the outer face of the end wall, and extending around the corner, and cemented to the outer face of the side wall. These side walls are, therefore, not integral with the end walls, but there is a dividing line between them at the corners.

With the use of the rubber members at the corners of the tray a substantially flush interior of the tray may be provided, these corner members or rubber pieces being applied to the outer or exterior sides of the ends and side walls of the tray extending around the joint between them from the end face of the tray to the side face thereof.

Instead of using the rubber piece outside of the tray at the corners thereof, they may be applied to the inner side of the tray at the corners to extend across the joint between the tray walls. Whether inside or outside these rubber pieces will effectively seal the joint, and at the same time allow the walls of the tray to have the spreading movement above described. Also openings may be made in the end walls of the tray at proper heights to determine the height of the water level in the tray, the excess water discharging through these openings.

The side walls have overhanging shoulders or lugs 5 to overlie the upper outer margins of the ice blocks or cubes, so that when these cubes are tilted upwardly upon the upward movement of the grid shown generally at 6, said cube will fulcrum against the under sides of the overlying lugs or projections, and by reason of the tilting action the side walls of the tray will swing outwardly and thus accommodate the tilting action of the cubes consequent upon the lifting of the grid and the separation of the cubes from the bottom and side walls of the tray.

The grid is of substantially known construction in so far as it is composed of a centrally extending longitudinal partition member set up on edge, and adapted to occupy a position midway of the width of the tray and extend from end to end thereof, said central partition having spaced apart partition fins or wings extending laterally therefrom across the tray to the side thereof. The grid 6 cooperates with the freezing tray to form a plurality of ice block or cube compartments, thereby dividing the ice into cubes, which may be dislodged from their compartment walls for individual or collective use.

The center grid member may be provided with projections indicated at 8, or it may be recessed to receive a portion of the ice cubes, so that in lifting this grid the ice cubes will lift with it at their adjacent inner ends. An arrangement including a pair of levers is employed for lifting the grid, and for this general purpose the grid at each end is provided with a flange or projection indicated at 9, under which a portion of the lifting lever is engaged as shown in Fig. 4. Each of the lifting levers is of such form as will rest on the upper surface of an ice cube adjacent an end of the tray. The flange 9 constitutes an abutment and such an abutment may be made in any suitable manner, as by forming the partition element in any convenient manner, providing openings in the partition element, or by attaching thereto any desirable element.

The general combination of an ice tray, a movable partition in the tray, and a manually operable arrangement adapted to exert a force between the partition and the top surface of the ice in the tray in order to mechanically release the ice from the tray and the partition is described and claimed in my copending application, Serial No. 4,707, filed February 2, 1935, and assigned to the General Electric Company, assignee of my present application.

The terminal partition or fin shown at 6a in the plan view of Fig. 3 is offset relative to the center bar or partition of the grid so that the flange or abutment 9 will lie about midway of the width of the tray. The offsetting of the fin will provide the necessary space for locating the flange 9 centrally as above mentioned. This will enable the operating lever to fulcrum on the ice at the end of the tray about midway of the width of the tray so that the lifting force will be applied about centrally of the width of the grid, and will tend to raise this grid in a vertical plane without tilting sidewise.

Preferably, each end of the grid is provided with a terminal partition or fin such as 6a and a projection 9, so that the lifting lever may be used at either end of the tray, or a lever may be used at each end at the same time to lift simultaneously the ends of the grid directly upwardly without tilting it from end to end. The lifting levers are shown at 10. The levers are disposed in the longitudinal vertical plane of the tray and fulcrum on the end cubes of ice and hold these down as the grid is lifted.

In mechanically releasing the ice blocks or cubes from the freezing tray and the grid the curved portion of one of the levers 10 is brought into operative relationship with one of the flanges 9 disposed on one end of the grid and the adjacent top surface of an ice block disposed in the ice block compartment adjacent the one end of the freezing tray.

The lever 10 is depressed causing the outer end of the curved portion thereof to exert an upward lifting force upon the grid and the lower surface of the curved portion thereof to fulcrum on the adjacent top surface of the ice block disposed in the ice block compartment adjacent the end of the freezing tray. The grid together with the ice blocks adhering thereto are lifted with respect to the freezing tray, which breaks the frozen bonds between all of the ice blocks and the freezing tray except the ice block upon which the curved portion of the lever 10 fulcrums. As the lever 10 is further depressed, the grid and the ice blocks adhering thereto are lifted further from the freezing tray causing the ice blocks to engage the overhanging shoulders or lugs 5 carried adjacent the upper edges of the side walls 2 of the freezing tray. Continued upward movement of the grid and the ice blocks causes the ice blocks to fulcrum against the under sides of the overhanging shoulders or lugs 5 which breaks the frozen bonds between the ice blocks and the grid. Thus, it will be understood that the ice blocks are mechanically released from their compartment walls formed by the grid and the freezing tray without necessitating thawing of the frozen bonds therebetween. The ice block in the ice block compartment adjacent the end of the freezing tray upon which the curved portion of the lever 10 is fulcrumed may be removed from the freezing tray in any suitable manner should it adhere thereto upon removal of the grid and the remainder of the ice blocks. It will be understood that the grid may be lifted with respect to the freezing tray by utilizing two levers 10 engaging the flanges 9 disposed adjacent the opposite ends of the grid in a manner similar to that described above.

Integral flanges are provided on the end walls of the tray extending inwardly as at 11 from their upper edges to overlie the end cubes of ice. The flanges will serve as rests or grips for the fingers when the tray is being flexed to dislodge any remaining cubes. This flange may be turned in to lie above the surface of the ice to any desired extent for comfort.

The grid may be lifted by a lever having a forked or bifurcated end to straddle the end fin which may be located directly in the central longitudinal plane of the grid, as is shown more clearly in Figs. 5 to 8, inclusive. This lever will hold down both end cubes while lifting the grid.

In Fig. 5, I have shown a modified form of freezing tray 20 containing a modified form of grid 21, which cooperates therewith to form a plurality of ice block or cube compartments. The freezing tray 20 is provided with a substantially flat bottom wall and an upwardly directed inclined marginal wall including sides 22. The sides 22 of the marginal wall are provided with inwardly directed overhanging shoulders or lugs 23 which overlie the upper outer margins of the ice blocks or cubes, so that when these cubes are lifted upwardly upon the upward movement of the grid 21 the blocks will fulcrum against the under sides of the shoulders or lugs 23 and will be swung outwardly breaking the frozen bonds between the ice blocks and the grid 21. The lugs 23 are separated from each other by a plurality of slots 24 formed in the sides 22 of the marginal wall of the freezing tray 20, these slots being sufficiently deep to prevent the freezing tray 20 from being filled with water beyond a predetermined height. Preferably, the freezing tray 20 is formed from a single piece of sheet metal by a suitable die-drawing operation.

The grid 21 is formed of sheet metal and comprises a central longitudinal partition 25 and a plurality of transverse partitions 26 constituting laterally extending fins, the longitudinal and transverse partitions being arranged in intersecting relation. The upper edges of the transverse partitions 26 extend somewhat above the upper edge of the longitudinal partition 25 and enter the slots 24 provided in the sides 22 of the marginal wall of the freezing tray 20 in order to position the grid 21 within the freezing tray 20. The central portions of the transverse partitions 26 disposed adjacent the opposite ends of the grid 21 are outwardly flanged to provide abutments 27 extending over the ice block compartments disposed in opposite ends of the freezing tray 20. It will be understood that such abutments may be made in any other suitable manner as by providing openings in the grid or by attaching thereto any desired element.

The ice blocks disposed in the ice block compartments formed by the freezing tray 20 and the grid 21 are mechanically released from their compartment walls by an arrangement including a pair of levers 28, without thawing the frozen bonds between the ice blocks and their compartment walls. Each of the levers 28 is provided with a bifurcated curved end forming two spaced-apart curved arms 29 separated by a slot 30.

In releasing the ice blocks from the freezing tray 20 and the grid 21, the levers 28 are brought into operative engagement with the transverse partitions 26 disposed on opposite ends of the grid 21 and extend longitudinally of the freezing tray 20. The slots 30 in the bifurcated curved ends of the levers 28 straddle the longitudinal partition 25, the outer ends of the spaced-apart curved arms 29 engage the abutments 27 provided on the transverse partitions 26 disposed on opposite ends of the grid 21, and the lower surfaces of the curved arms 29 of the bifurcated curved end of the levers 28 engage adjacent top surfaces of the ice blocks disposed on opposite sides of the longitudinal partition 25 and in the ice block compartments disposed in the opposite ends of the freezing tray 20. The outer ends of the levers 28 are depressed simultaneously causing the lower surfaces of the curved arms 29 of the bifurcated ends of the levers 28 to fulcrum on the adjacent top surfaces of the ice blocks and to exert lifting forces upon the grid 21. These forces cause the grid 21 and all of the ice cubes adhering thereto except the ice cubes upon which the levers 28 fulcrum to be lifted with respect to the freezing tray 20, which breaks the frozen bonds between the ice blocks being lifted and the freezing tray 20. As the outer ends of the levers 28 are further depressed, the grid 21 and the ice cubes adhering thereto are lifted further with respect to the freezing tray 20 causing the ice blocks to come into engagement with the overhanging shoulders or lugs 23. The ice blocks are then fulcrumed against the under sides of the overhanging lugs 23 which swings the ice blocks outwardly and breaks the frozen bonds between the ice blocks and the grid 21. The grid 21 and the ice blocks which have been mechanically released may then be removed from the freezing tray. The ice blocks disposed in the ice block compartments in the ends of the freezing tray upon which the levers 28 fulcrum may then be released from the freezing tray 20 in any suitable manner if they still adhere thereto after the grid 21 and the remainder of the ice blocks have been removed from the freezing tray 20.

It will be understood that the ice blocks may be mechanically released from their compartment walls by utilizing only one of the levers 28 in a manner similar to that described above, the lever being brought into operative engagement with one of the abutments 27 disposed on one end of the grid 21.

It will thus be understood that the ice blocks disposed in the ice block compartments formed by the freezing tray 20 and the grid 21 are mechanically released from their compartment walls without thawing the frozen bonds therebetween.

While I have shown and described two embodiments of my invention, modifications thereof will be apparent to those skilled in the art. I do not, therefore, desire my invention to be limited to the particular construction shown and described and I intend in the appended claims to cover all modifications within the spirit and scope of my invention.

What I claim as new and desire to secure by Letters Patent of the United States is:

1. In combination with a freezing tray, a grid cooperating with said freezing tray to form a plurality of ice block compartments, said grid having a flange extending over at least one of said compartments, and manually operable means including a lever adapted to be disposed longitudinally of said freezing tray and adapted to engage the flange on said grid and to fulcrum on an adjacent top surface of an ice block disposed in one of said compartments for mechanically releasing an ice block from all of its compartment walls.

2. In combination with a freezing tray, a grid comprising a plurality of partitions and cooperating with said freezing tray to form a plurality of ice block compartments, said grid having an abutment adjacent the upper portion thereof, and manually operable means including a lever having a bifurcated end adapted to straddle one of said partitions and to engage the abutment on said grid and adjacent top surfaces of ice blocks disposed in said compartments for mechanically releasing an ice block from at least one of its compartment walls.

3. In combination with a freezing tray, a grid comprising a longitudinal partition and a plurality of transverse partitions and cooperating with said freezing tray to form a plurality of ice block compartments, at least one of said transverse partitions having an abutment adjacent the upper portion thereof, and manually operable means including a lever having a bifurcated end adapted to straddle said longitudinal partition and to engage the abutment on said one transverse partition and adjacent top surfaces of ice blocks disposed in said compartments for mechanically releasing an ice block from at least one of its compartment walls.

4. In combination with a freezing tray, a grid cooperating with said freezing tray to form a plurality of ice block compartments, said grid having a pair of spaced apart abutments adjacent the upper portion thereof, and manually operable means including a pair of levers adapted to engage the abutments on said grid and the top surfaces of at least two spaced apart ice blocks disposed in said compartments for mechanically releasing each of the ice blocks from at least one of its compartment walls.

5. In combination with a freezing tray, a grid comprising a longitudinal partition and a plurality of transverse partitions and cooperating with said freezing tray to form a plurality of ice block compartments, said grid having a pair of spaced apart abutments adjacent the ends thereof, and manually operable means including a pair of levers having bifurcated ends adapted to straddle said longitudinal partition and to engage the abutments on said grid and the top surfaces of ice blocks disposed in said compartments adjacent the ends of said freezing tray for mechanically releasing each of the ice blocks from at least one of its compartment walls.

6. In combination with a freezing tray, a movable grid comprising a substantially central longitudinal partition, a plurality of transverse partitions and a terminal partition, said terminal partition extending longitudinally of said freezing tray and being laterally offset from said central partition, and means including an abutment on said grid adjacent the end of said central partition adapted to be engaged by a member for lifting said grid with respect to said freezing tray.

7. An ice tray having a grid removable therefrom and having a central bar or partition with laterally extending fins or partitions, and a terminal fin extending in the direction lengthwise of the grid, said terminal fin being offset from the center line of the grid, and a projection at the end of the grid arranged about centrally of the width thereof to be engaged by a lever for lifting the grid, substantially as described.

8. A sheet metal freezing tray having integral side bottom and end walls, said side and end walls being resiliently connected together adjacent the corners of said freezing tray to facilitate limited movements of said side walls, and means including integral inwardly directed flanges on said end walls providing finger rests for facilitating movements of said side walls.

JAMES H. MINER.